(12) United States Patent
Kolehmainen

(10) Patent No.: US 8,847,909 B2
(45) Date of Patent: Sep. 30, 2014

(54) TOUCHABLE MOBILE REMOTE CONTROL WITHOUT DISPLAY

(71) Applicant: Aki Kalevi Kolehmainen, Taipei (TW)

(72) Inventor: Aki Kalevi Kolehmainen, Taipei (TW)

(73) Assignee: Nomovok Co., Ltd., Taipei (TW)

( * ) Notice: Subject to any disclaimer, the term of this patent is extended or adjusted under 35 U.S.C. 154(b) by 93 days.

(21) Appl. No.: 13/674,046

(22) Filed: Nov. 11, 2012

(65) Prior Publication Data

US 2014/0132497 A1 May 15, 2014

(51) Int. Cl.
*G06F 3/041* (2006.01)
*G08C 19/00* (2006.01)
*G09G 3/00* (2006.01)

(52) U.S. Cl.
CPC . *G08C 19/00* (2013.01); *G09G 3/00* (2013.01)
USPC .......................................... 345/173; 345/156

(58) Field of Classification Search
None
See application file for complete search history.

(56) References Cited

U.S. PATENT DOCUMENTS

| 2001/0040551 A1* | 11/2001 | Yates et al. ..................... 345/156 |
| 2009/0158222 A1* | 6/2009 | Kerr et al. ....................... 715/867 |
| 2011/0109587 A1* | 5/2011 | Ferencz et al. ................ 345/174 |
| 2012/0293456 A1* | 11/2012 | Ikeda et al. .................... 345/174 |

FOREIGN PATENT DOCUMENTS

WO   WO 2011158475 A1 * 12/2011

* cited by examiner

*Primary Examiner* — Adam R Giesy

(57) ABSTRACT

A mobile remote control is provided. The mobile remote control includes a touch surface without a display and is adapted to an electronic device with a display. Each touch event on the touch surface is reflected on the display directly relative to the position and nature of the event on the touch surface. The size of the touch surface is small enough so that user's fingers can be around it. The sensitivity of the palm makes it possible for user to know the relatively position of his finger on the touch surface without gazing at ft.

6 Claims, 9 Drawing Sheets

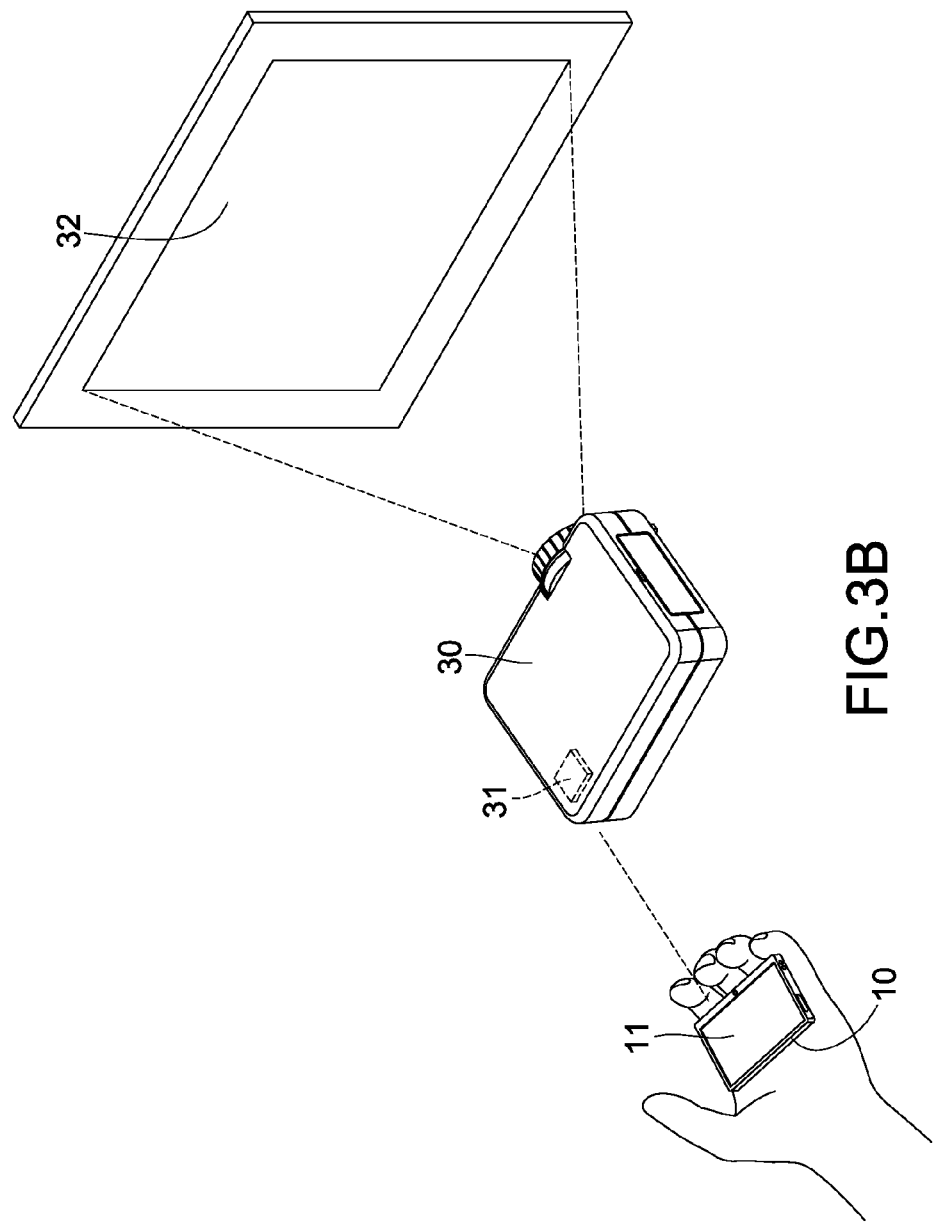

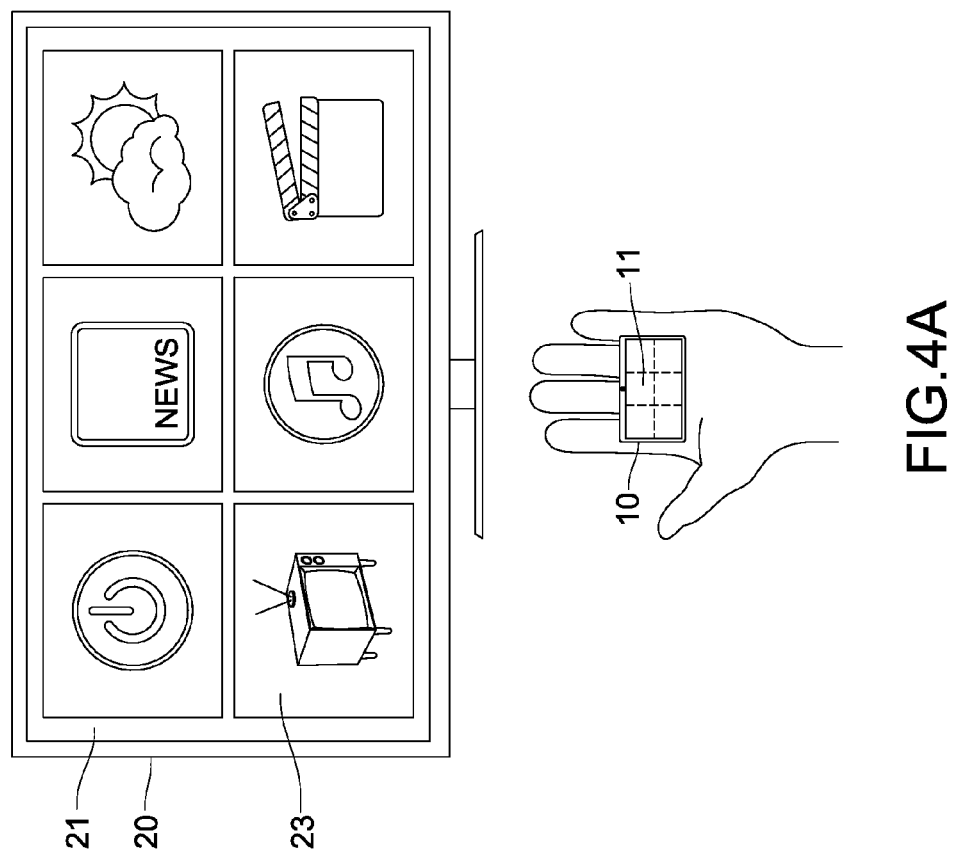

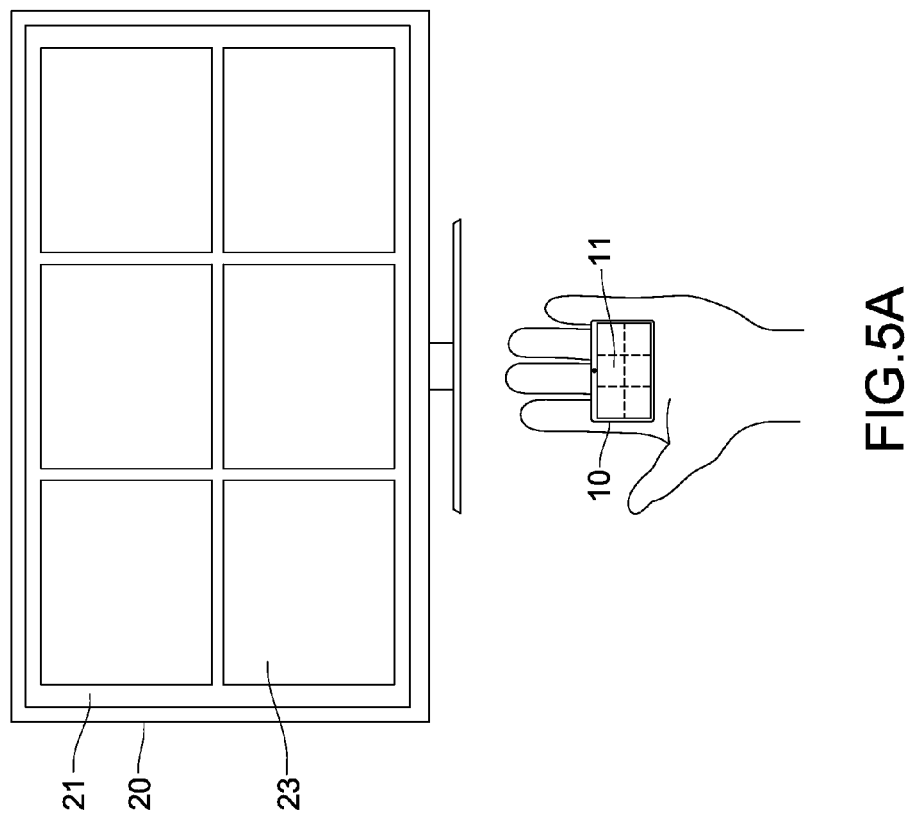

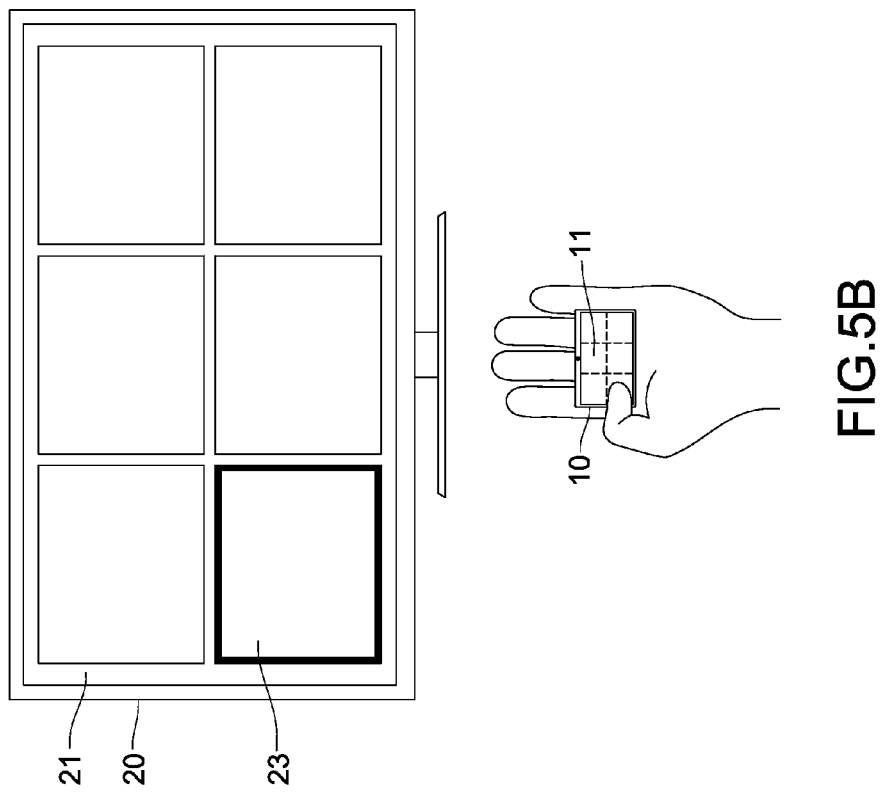

TOUCHABLE MOBILE REMOTE CONTROL WITHOUT DISPLAY

BACKGROUND OF THE INVENTION

1. Field of the Invention

The present invention relates to a remote control which is adapted to control an electronic device with a display, and more particularly but not by any way of limitation, to a mobile remote control with a touch surface and without a display to reflect each touch event on the display of the electronic device.

2. Related Art

Hand-held remote control devices have long been used to conveniently control television sets without abandoning the comfort of the couch or chair from which the television is being viewed. Early remote devices were small rectangular units controlling an on-off function, the volume, and a TV channel up or down selection. With the growth in the home audio-visual market, the hand-held remote devices have evolved by adding keypads, triggers, and track balls. Multi-function and universal remote units, controlling several electronic devices, are in use. The physical size of the remote has increased, becoming more elongated to include the greater number of control functions.

The increased size has resulted in the television remote control becoming unwieldy for single-handed use. Typically, an operator has pointed the remote at the desired electronic appliance, awkwardly tipping the operator's wrist forward in an uncomfortable position. The operator further was required to balance the remote in his fingers, while manipulating the remote's controls with his thumb. If the operator momentarily relaxed his grip while holding the remote near its ends, the remote would tip forward or rearward, often falling on the floor. Not only does television remote control operation tire the hand and wrist of a user, repetitive operation may subject a user to injuries such as carpal tunnel syndrome.

Moreover, new TV sets still offer traditional remote controls with an increasingly complex jungle of buttons. Using them to control the content is clunky, old-fashioned and mostly unsuitable when compared with alternative devices. Also, it is lack of good way to control the content of the new TV. When the way to control the content is poor, also the content itself is affected negatively.

Recently, some new ways to control the new TV, especially to the smart TV, have emerged, such as hand gesture control, voice control, or control by smart phone application. However, using hand gestures or voice controls to manage the content has the downside in the high amount of energy they require when compared to a conventional remote control. Using a smart phone to control the television has a primary problem. The smart phone is a private device and the television is a public one. The owner of the smart phone would not give his smart phone to other people. Furthermore, a smart phone application would require the user to frequently move his gaze from the television screen to the smart phone screen, requiring constant focusing and making the experience uncomfortable and tiring in the long run.

SUMMARY OF THE INVENTION

To solve the aforementioned problems of the prior art, the present invention provides a mobile remote control with a good way to control the content on the screen by a touchable surface.

Accordingly, the present invention discloses a mobile remote control including a touch surface and a processor. The touch surface without a display is configured to receive a touch event. The processor is configured to generate a control signal in response to the touch event and send the control signal to an electronic device with a display for controlling. The control signal is sent to control the same position relative to the display of the electronic device with the position of the touch event relative to the touch surface so that it can replicate the exact same touch event on the display.

The size of the touch surface is small enough so that user's fingers can be around it. The sensitivity of the palm makes it possible for user to know the relative position of his finger on the touch surface without gazing at it. Enabling all touch features using a single finger also maintains the same energy level that users are already used to. In fact, not having to point the mobile remote control to the display even lowers the needed energy.

These and other features, aspects, and advantages of the present invention will become better understood with reference to the following description and appended claims. It is to be understood that both the foregoing general description and the following detailed description are examples, and are intended to provide further explanation of the invention as claimed.

BRIEF DESCRIPTION OF THE DRAWINGS

The present invention will become more fully understood from the detailed description given herein for illustration only, and thus is not limited to the present invention, and wherein:

FIGS. 3A to 3B are respective views of the mobile remote control when utilizing in embodiments in accordance with the present invention;

FIGS. 4A and 4B are respective views of using methods for the mobile remote control in accordance with the present invention; and FIGS. 5A and 5B are respective views of another embodiments of using methods for the mobile remote control in accordance with the present invention.

DETAILED DESCRIPTION OF THE INVENTION

Figure 1A:
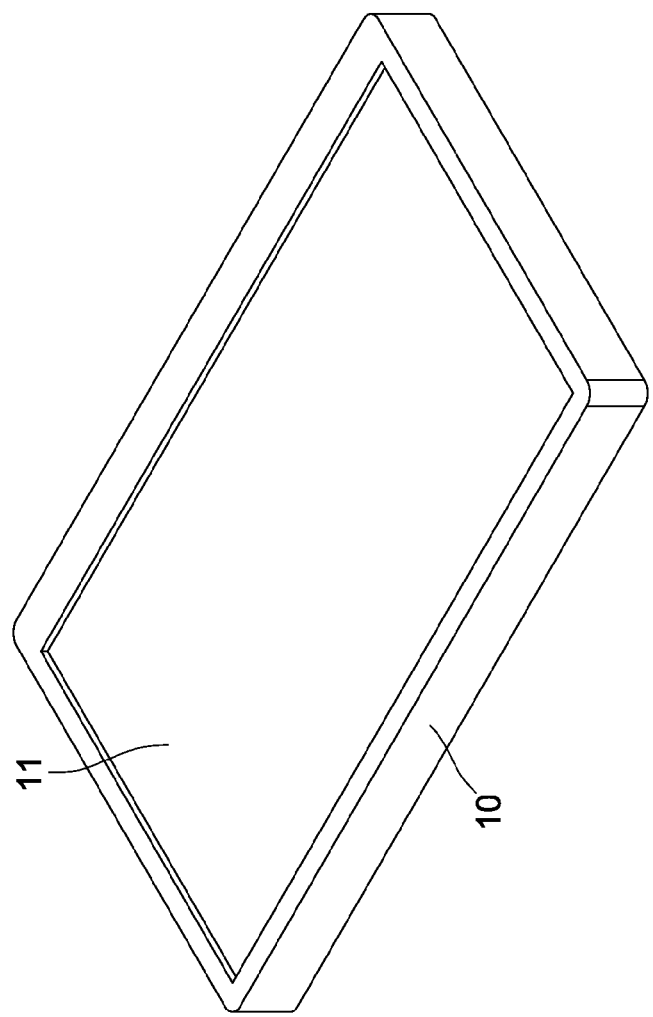
FIGS. 1A and 1B are respective views of the mobile remote control in accordance with the present invention.
Figure 1B:
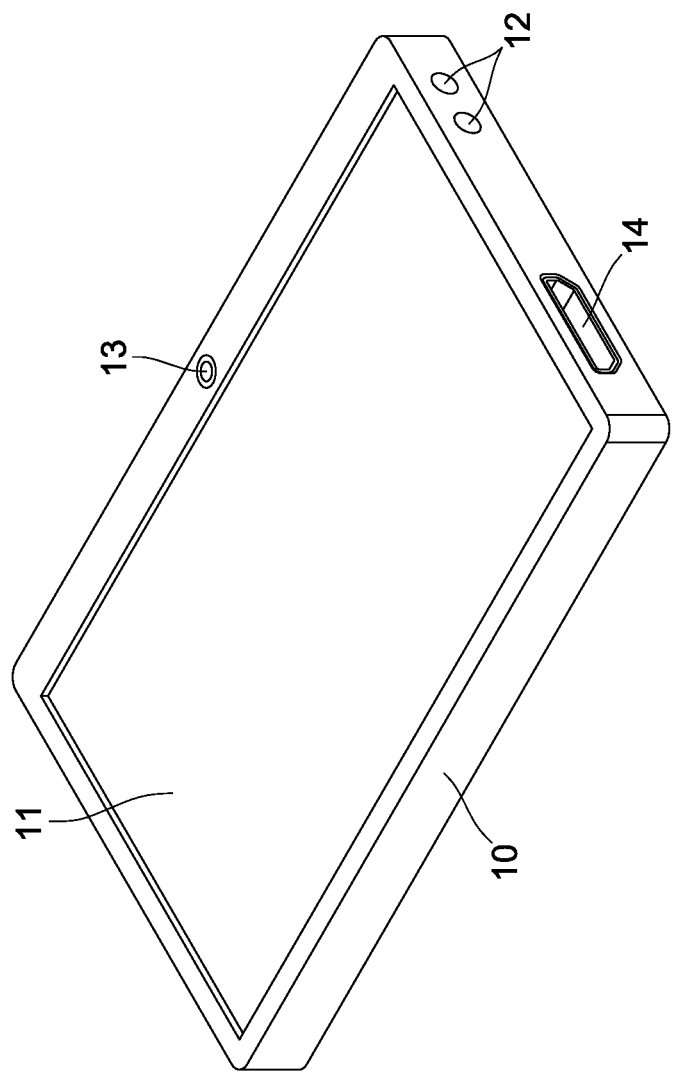

Reference will now be made in detail to the present preferred embodiments of the invention, examples of which are illustrated in the accompanying drawings. Wherever possible, the same reference numbers are used in the drawings and the description refers to the same or the like parts.

Please refer to FIG. 1A. The mobile remote control 10 includes a touch surface 11 without a display. The mobile remote control 10 has a size suitable for a user to place the mobile remote control 10 fully on his single palm for operation. For example, the mobile remote control 10 surface area is generally rectangular and has the size 2.5 to 3.5 inches by 1.5 to 3.0 inches. The size of the touch surface 11 is small enough so that user's fingers can be around it. The sensitivity of the palm makes it possible for user to know the relatively position of his finger on the touch surface 11 without gazing at it. Enabling all touch features using a single finger, by design the thumb, also maintains the same energy level that users are already used to. Area around the touch surface 11 is slightly above the touch surface 11 so that the boundary of the touch surface 11 is easily recognized by his finger. The backside of the device can optionally be curved in order to have a better support of the palm.

Figure 2:
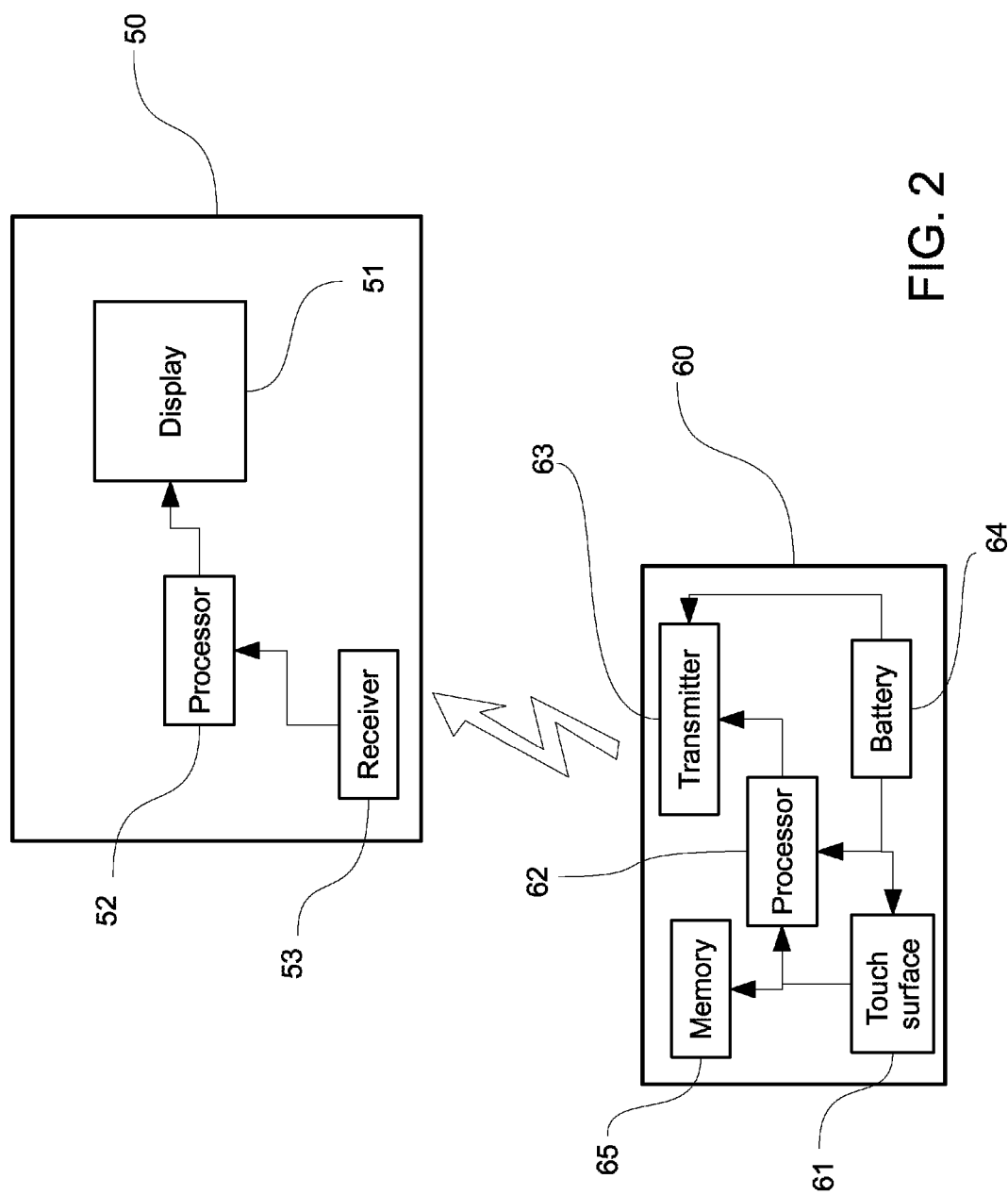
FIG. 2 is block diagram of the mobile remote control in accordance with the present invention.

Please see FIG. 2, the mobile remote control 60 is adapted to control the electronic device 50 with a display 51. The mobile remote control 60 includes a touch surface 61, a processor 62, a transmitter 63, a battery 64, and a memory 65. The electronic device 50 includes a display 51, a processor 52, and a receiver 53. The touch surface 61 is configured to receive a touch event. The processor 62 is configured to generate a control signal in response to the touch event and send the control signal by the transmitter 63 to the electronic device 50 so that it can replicate the exact same touch event on the display. The electronic device 50 receives the control signal by the receiver 53. The control signal is sent by using one or more of wireless communication methods including wireless local area network (WLAN), Bluetooth, Zigbee, wireless broadband (WiBro) internet, wireless universal serial bus (WUSB), radio frequency identification, and infrared data association (IrDA) technologies.

For example, using WLAN to connect the mobile remote control 60 and the electronic device 50 enables free position of user's hand in relation to the display 51 (or receiver 53). User does not need to point the display 51 with the mobile remote control 60. In fact, not having to point the mobile remote control 60 to the display 51 even lowers the needed energy.

Figure 3A:
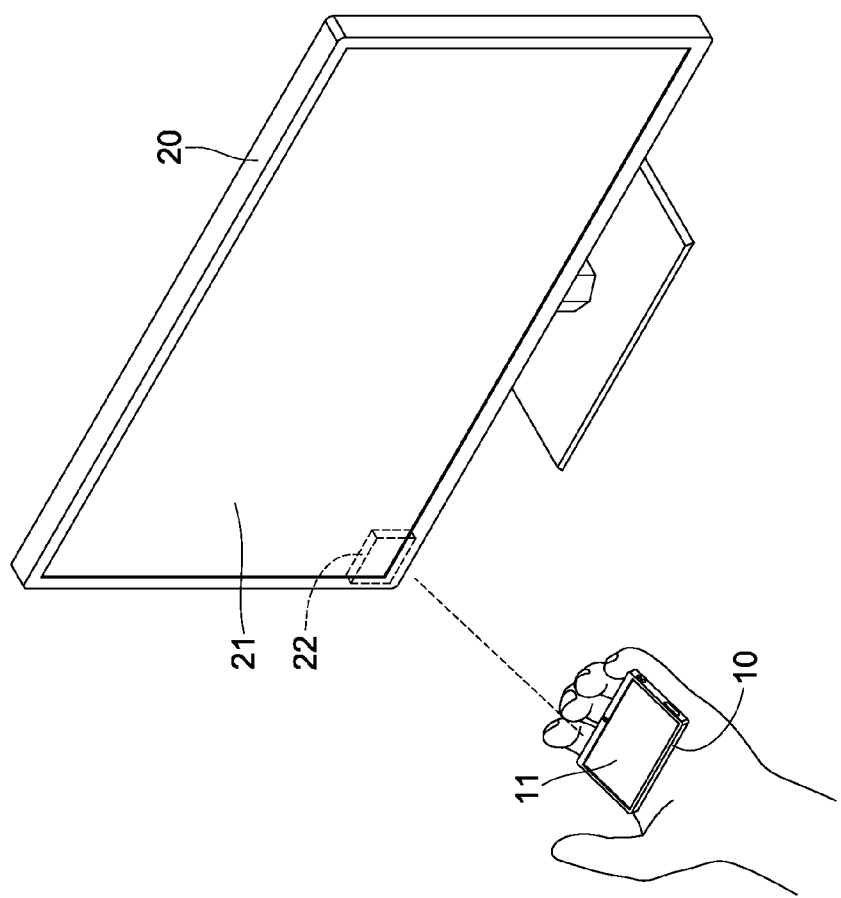

The touch surface 61 has the substantially same shape as the display 51 of the electronic device 50 and has a different size. When the electronic device 50 receives the control signal, the processor 52 would control the same position relative to the display 51 of the electronic device 50 with the absolute position of the touch event relative to the touch surface 61, using its absolute coordinates. The mobile remote control 10 can be utilized in a smart TV 20, see FIG. 3A. The smart TV 20 includes a display 21 and a receiver 22. The mobile remote control 10 may also be utilized in a projector 30, see FIG. 3B. The projector 30 includes a display (screen) 31 and a receiver 32. Furthermore, the mobile remote control 10 may also be utilized in any other remote electronic device with a display.

Figure 4B:
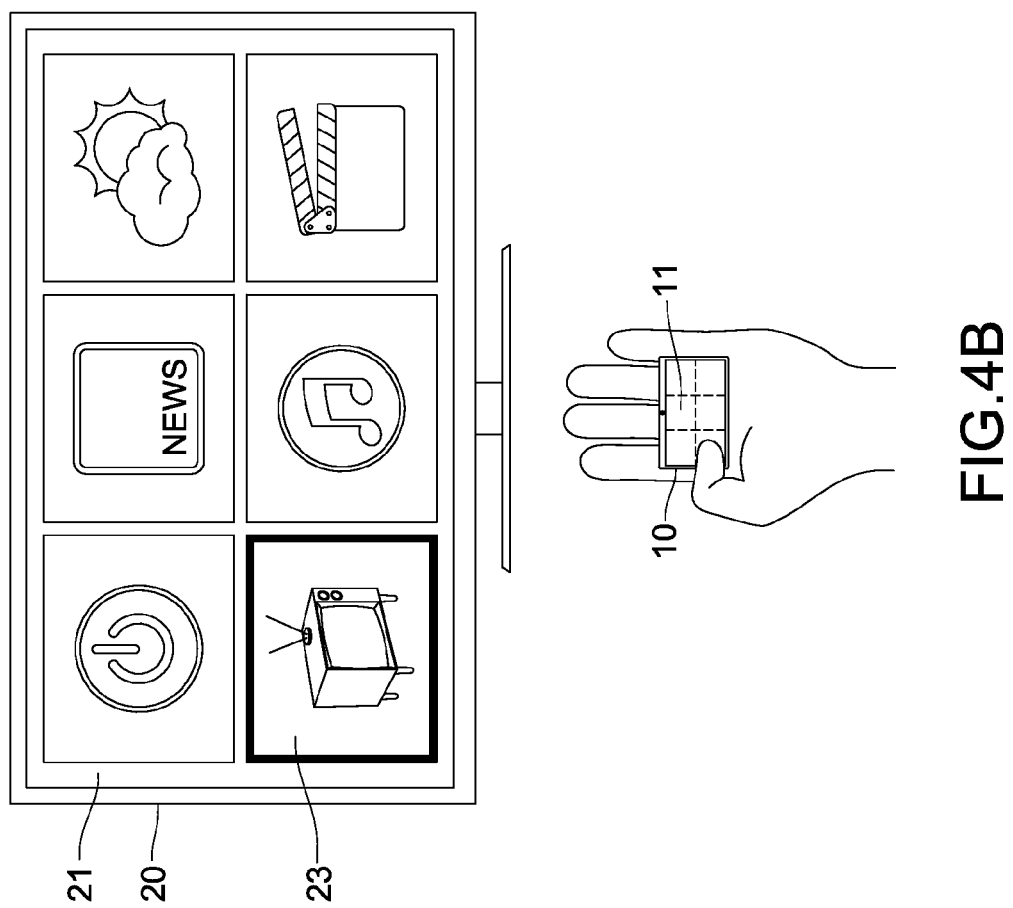

Take a smart TV 20 for example, please refer to FIGS. 4A and 4B, the smart TV 20 has a display 21 with 16:10 aspect ratio. Therefore, the touch surface 11 also has 16:10 aspect ratio accordingly. The smart TV 20 shows several blocks, functions for control. As the FIG. 4A shows, there may be six functions, for example. When the user taps the bottom left block of the touch surface 11 of the mobile remote control 10, the smart TV 20 will receive by the receiver 22 a control signal to tap the bottom left block of the display 21 of the smart TV 20, please see FIG. 4B. Note that the touch surface 11 of the mobile remote control 10 does not have the dotted line. It is only shown to explain the above operation.

Moreover, the touch event may be a tap, double tap, long press, sweep, or over its borders, or any other touch gesture operable by a finger. Also, the graphical element shown in FIGS. 4A and 4B may be disabled by a setting in the control software of the remote electronic device 10, so that the user can perceive the location on the display 11 where the touch has effect during and only during the period of time when the touch action is taking place, please see FIGS. 5A and 5B.

Please see FIG. 2B, the mobile remote control 10 may also have LED indicators 12 to indicate power, battery/load status, connectivity of WLAN, and etc. Depending on the selected wireless technology, the mobile remote control 10 may also have a camera 13 for video calls. Depending on the selected battery technology, it may also have a connecting port 14 for charging. Also, depending on the additional inbuilt features, the mobile remote control 10 may also have an inbuilt fingerprint reader behind the touch surface 11 so that pressing the touch surface 11 with the finger for a predetermined time would send the fingerprint to the server where user identification data are stored. If successful, the user would be allowed to access his private services in the Internet as well as any Smart Home extensions that are connected to the solution.

By this mobile remote control, all the following services can be controlled:

Watching TV and radio channels, enjoying music and movies.

Making video and audio calls, in connection with the mobile remote control.

Using fully functional Internet Browser.

Sharing pictures, videos and other material and receiving it.

Gaming entertainment.

Connectivity to 3rd party karaoke and other appliances.

Benefiting from almost any kind of downloadable touch based applications.

Any other applications and solutions generally accessible with touch devices.

While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

The invention claimed is:

1. A mobile remote control adapted for an electronic device with a display, comprising:
   a touch surface without a display, configured to receive a touch event; and
   a processor, configured to generate a control signal in response to the touch event and send the control signal to the electronic device so that it can replicate the exact same touch event on the display;
   wherein the mobile remote control surface area is generally rectangular and has a size 2.5 to 3.5 inches by 1.5 to 3.0 inches suitable for a user to place the mobile remote control fully on his palm for operation;
   wherein both the remote control device surface area and the touch surface have the substantially same shape and aspect ratio as the display of the electronic device, but a different size;
   wherein the control signal is sent to control a same position relative to the display of the electronic device with an absolute position of the touch event relative to the touch surface.

2. The remote control of claim 1, wherein the control signal is sent by using one or more of wireless communication methods including wireless local area network (WLAN), Bluetooth, Zigbee, wireless broadband (WiBro) internet, wireless universal serial bus (WUSB), radio frequency identification, and infrared data association (IrDA) technologies.

3. The remote control of claim 1, wherein the touch event is a tap on the touch surface and the control signal is sent to the electronic device to generate an exactly matching tap on the display of the electronic device in the same relative position using its absolute coordinates as in the touch surface.

4. The mobile remote control of claim 1, wherein the touch event is a double tap on the touch surface and the control signal is sent to the electronic device to generate an exactly matching double tap on the display of the electronic device in the same relative position using its absolute coordinates as in the touch surface.

5. The mobile remote control of claim 1, wherein the touch event is a long press on the touch surface and the control signal is sent to the electronic device to generate an exactly matching long press on the display of the electronic device in the same relative position using its absolute coordinates as in the touch surface.

6. The mobile remote control of claim 1, wherein the touch event is a sweep, or over its borders, on the touch surface and the control signal is sent to the electronic device to generate an exactly matching sweep on the display of the electronic device in the same relative position using its absolute coordinates as in the touch surface.

\* \* \* \* \*